March 15, 1932.  W. A. GORDON  1,849,291
MACHINE FOR PLASTICATING MATERIALS
Filed April 23, 1929   3 Sheets-Sheet 1

INVENTOR:
William A. Gordon
By Attorneys,

March 15, 1932. W. A. GORDON 1,849,291
MACHINE FOR PLASTICATING MATERIALS
Filed April 23, 1929 3 Sheets-Sheet 3

INVENTOR :
William A. Gordon
By Attorneys,

Patented Mar. 15, 1932

1,849,291

UNITED STATES PATENT OFFICE

WILLIAM A. GORDON, OF SHELTON, CONNECTICUT, ASSIGNOR TO FARREL-BIRMINGHAM COMPANY, INCORPORATED, OF ANSONIA, CONNECTICUT, A CORPORATION OF CONNECTICUT

MACHINE FOR PLASTICATING MATERIALS

Application filed April 23, 1929. Serial No. 357,396.

This invention relates to machines for plasticating materials, and aims to provide certain improvements therein.

In reissued Patent No. 17,070, dated August 28, 1928, I have described and claimed a construction of device which, while capable of general application, is especially directed to the plasticating of previously mixed rubber compounds to especially fit them for use in connection with subsequent manipulation in calenders, presses, tube machines, or the like.

According to the present invention I aim to provide a machine which constitutes in one sense an improvement over the patented device, and which furthermore has the capacity for working crude rubber so as to specially fit the rubber for the introduction into suitable mixing machines, whereby the time of the mix is reduced. This is accomplished, according to my invention, by the use of a construction which is much more economical to build and operate than the standard mixing machines, and hence results in a cheapening of the total operation of mixing, while increasing the capacity of the standard mixers.

The device of the present invention therefore, whether it is used in the preliminary step of breaking down the crude rubber prior to mixing, or the subsequent process of softening or plasticating already formed mixtures so as to fit them for calenders, presses, or the like, results in a saving in the total cost of operation as compared with the machines of the prior art, which saving is of considerable importance. Irrespective of whether the present machine is used in one or the other of the above operations, or of still other operations of which it is capable where materials are to be plasticated, the efficiency of the machine is great and its product is of superior quality.

In the plastication of cold rubber or its compounds the result is secured by the working of the stock, which of course is accompanied by (and utilizes) the generation of heat. Such heat must be very carefully controlled to avoid partial vulcanization. I have found that, as compared with the patented structure, I can provide a machine which works on the continuous principle, in which the product is subjected to the plasticating operation for a considerable time longer than in my prior patent, and by so constructing the machine so that the operation is divided into two stages, I am not only able to produce a better resultant product with less danger of overheating, but I am also able to provide a machine which is very economical of floor space and power requirements.

By preference, when I use two distinct stages I can so construct the apparatus that that part of it which is devoted to the initial stage is mounted above, and on the same base as that which performs the second stage. The invention includes other features of improvement which will be hereinafter more fully described.

According to the drawings wherein I have shown the preferred form of the invention:—

Fig. 4 is a cross-section of the upper member taken on the line 4—4 in Fig. 1.

Fig. 6 is a section on the line 6—6 in Fig. 4.

Fig. 7 is a detail, showing the worm of Fig. 5 on an enlarged scale.

Figure 1:
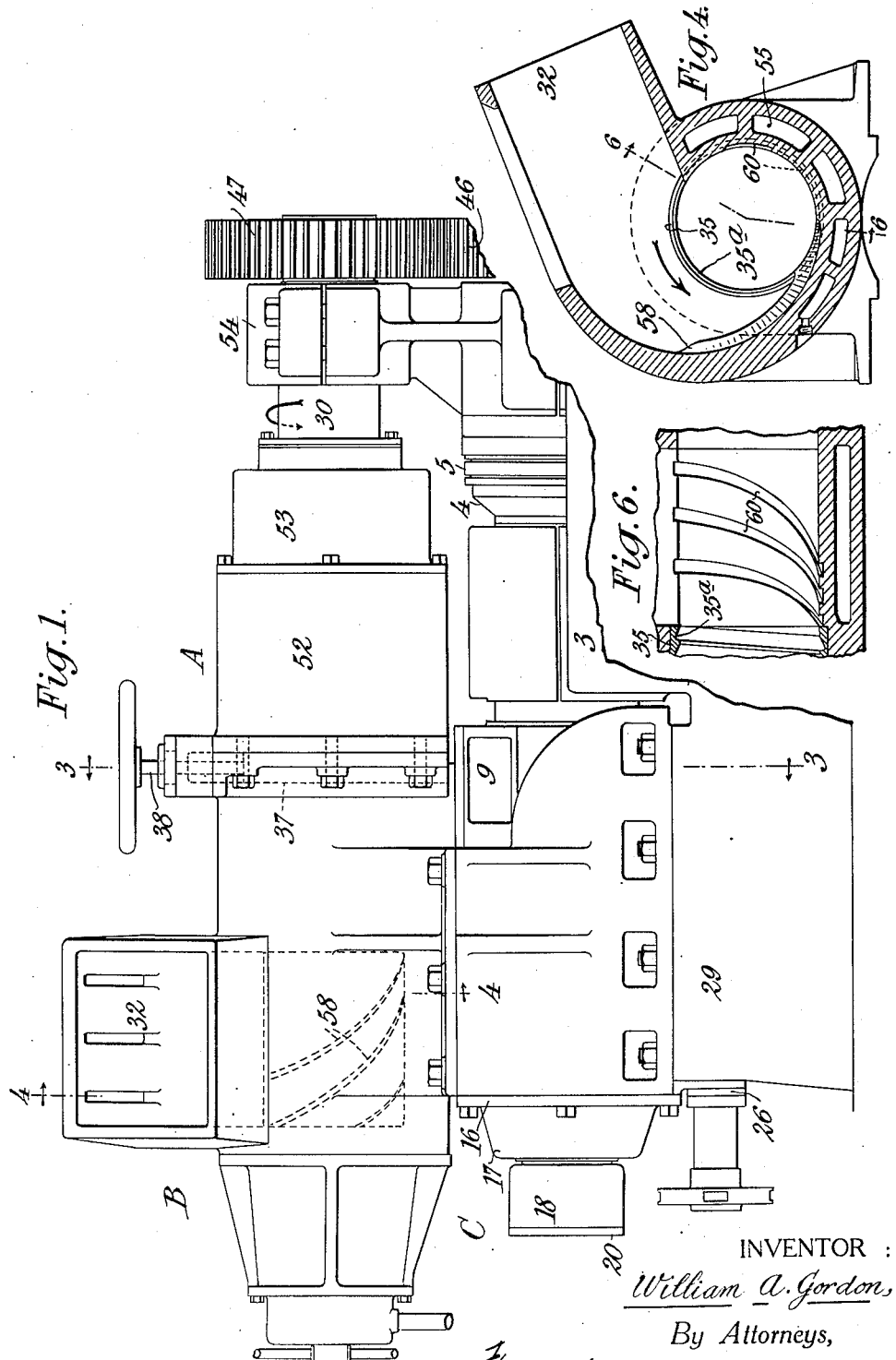
Figure 1 is an elevation showing substantially the complete device.

Referring to the drawings, let A indicate the machine as a whole, which in its preferred form is shown as comprising apparatus for dealing with the rubber in two stages, the first stage taking place in the section B, and the second stage in the section C.

First directing attention to the lower section C, it is to be observed that in construction and operation it is substantially the same as the device illustrated in the aforesaid patent. It comprises a shaft 1 which is mounted to rotate in bearing bushings 2 supported by the bed 3. Between a collar 4 on the shaft and one of the bearings is a roller thrust bearing 5. The shaft is provided on its exterior with a screw thread or worm 7 of large diameter and volumetric capacity. Enclosing the worm and slidably mounted on the bed axially of the worm is a water-jacketed housing 8. The pitch of the worm becomes much steeper and its volumetric capacity considerably reduced toward the discharge end of the housing, and the interior diameter of the housing is substantially the same as the diameter of the worm threads. The housing is provided with an opening 9 into which the rubber is fed, which rubber is separated from the mass and is pushed forward by the thread of the worm when the shaft is rotated, and collected in a compacted mass at the delivery end of the work. This results in heavy pressure on the rubber at the far end of the worm, with a consequent development of heat which keeps the mass plastic. The delivery end of the worm is provided with a tip 14 which is preferably of conical form, and which is provided with portions 15 which are illustrated as grooves or corrugations which preferably grow less in width and depth as they approach the forward end of the tip. Bolted to the housing is a head portion 16 which is preferably formed in two parts, 17 and 18, both being preferably water-jacketed as shown. The interior of the head 16 is also preferably provided with grooves or corrugations. I intend to include in the term "grooves or corrugations" any sort of irregularities in the contour of the several parts by which there will be projections or indentations. It should be noted, however, that such projections or indentations are preferably smooth surfaces. The conical space which is defined between the tip and the head constitutes a kneading chamber into which the rubber is forced by the action of the screw 7, and wherein the rubber is thoroughly kneaded, and finally by the pressure of the material back of it is extruded out of the machine. For most purposes a suitably formed die 20 will be provided which gives the issuing product whatever cross-section is desired for the subsequent operations. The housing 8 is adjustable longitudinally by means of a threaded shaft 21 which operates on a nut or nuts 22 held against longitudinal displacement by recesses 23. By rotation of the screw 21 the housing is moved longitudinally with the effect of increasing or decreasing the capacity of the kneading chamber, it being understood that the pressure of the material tends to force the screw back against its anti-friction bearing 5 and the housing forward against the flange 26 of the screw 21. The device, hence, is capable of precise adjustment not only with reference to the capacity of the kneading chamber, but with reference to the proximity of the two kneading surfaces.

Figure 3:
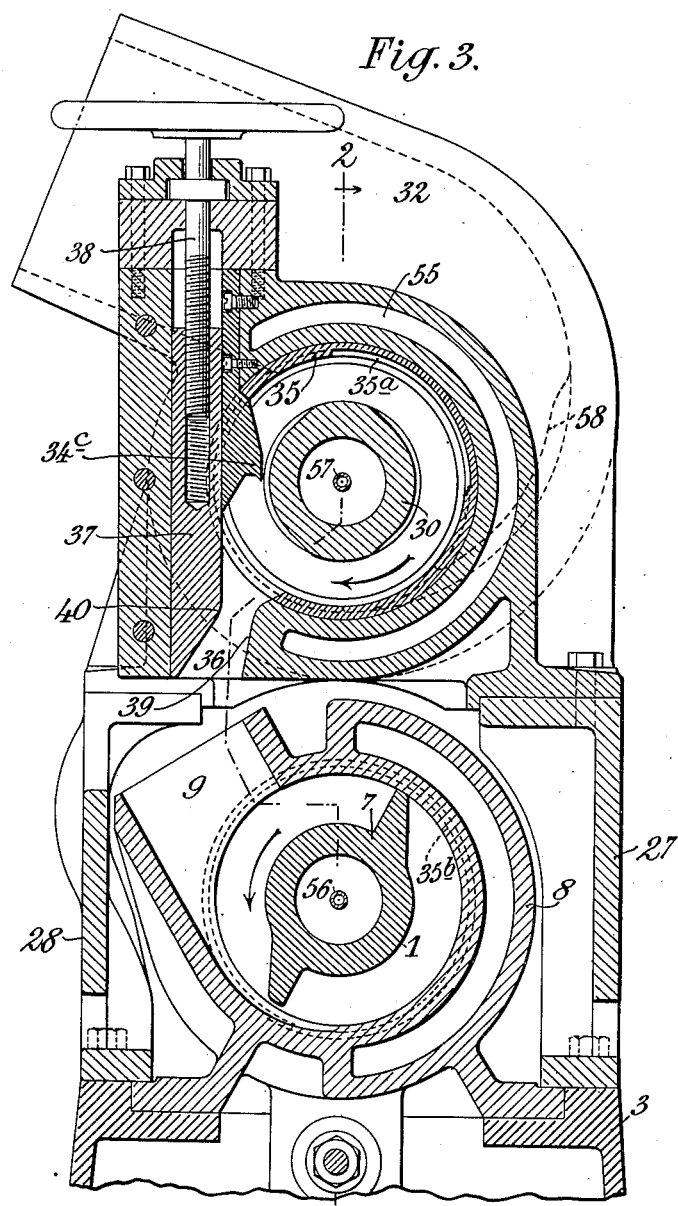
Fig. 3 is a transverse sectional view taken on the line 3—3 in Figs. 1 and 2.
Figure 5:
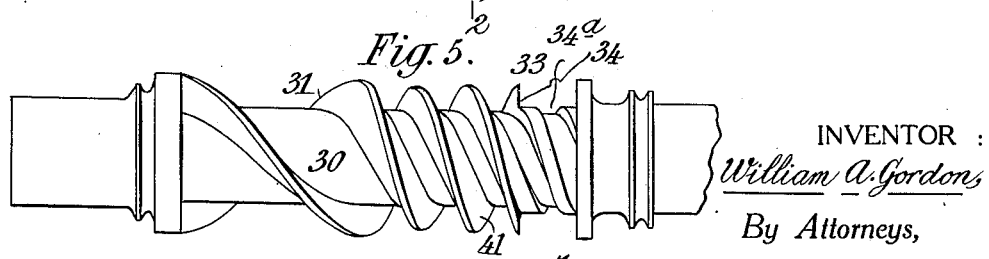
Fig. 5 is an elevation of the worm of the upper or initial section.

According to the present invention an initial or preliminary plasticating section B is provided which by preference is mounted above the section C, being bolted to side plates 27 and 28 which are in turn bolted to the base 3, as best seen in Fig. 3. This initial or first stage plasticator also comprises a screw shaft or worm which is indicated by the reference numeral 30, the form of thread being preferably that indicated in the drawings, wherein there is a feeding section 31 of quick pitch which is designed to receive the rubber fed into the machine through a feed hopper 32, and cut or crush off the rubber from the main piece or pieces, feeding it rearwardly so that it comes under the influence of a section of much slower pitch, but of decreasing diameter. After this section, which comprises about one thread, the worm is best constructed so that the succeeding threads or convolutions (forming a section 33) are progressively higher until the end 34 is reached, thus decreasing the distance between the threads and the lining 35, which is shown as constituting the chamber in which the worm works (see Fig. 7). It results from this construction that the rubber is squeezed through the consecutively narrow passages between the tops of the worm threads and the lining 35, which gives a preliminary working to the rubber and develops considerable heat.

The exact gradient of the worm threads may be varied, but I prefer that in a full size machine the left-hand end of the thread will have a clearance of about three-quarters of an inch, and the right-hand end of the thread a clearance of about three-eighths of an inch. To the right of the point 34 which marks the extreme right-hand end of the full sized thread, I provide a groove 34$^a$, which groove in radial dimension, however, is preferably not so deep as to entirely destroy the thread, but which, on the contrary, leaves the base of the thread still intact. The right-hand side of the groove is marked by a flange 34$^b$ which stops the flow of the material. This groove to an extent forms a collecting chamber for the material, and also a stripping chamber for the latter, it being understood that there is to some degree a tendency for the material to rotate with the screw. By reference to Fig. 3 it will be observed that I provide a stripper or plow 34$^c$ which is mounted in fixed position opposite the groove, and which dislodges any material which tends to rotate with the screw.

The material, having thus reached the end of the useful functioning of the upper section, is discharged through an opening 36, which is best seen in Fig. 3, into the hopper 9 of the housing of the lower worm 1. The rate of flow from the top section to the bottom is regulated by a suitable valve 37 actuated by a hand shaft and wheel 38. The discharge opening 36 is preferably formed with an inclined wall 39 so that as the surface 40 of the valve is lowered the effective opening becomes less and the rate of discharge, and, hence, the rate of passage and degree of working in the section B are controlled. The upper worm 30 preferably has its thread formed with angular faces 41 which accentuate the working effect of the worm.

Figure 2:
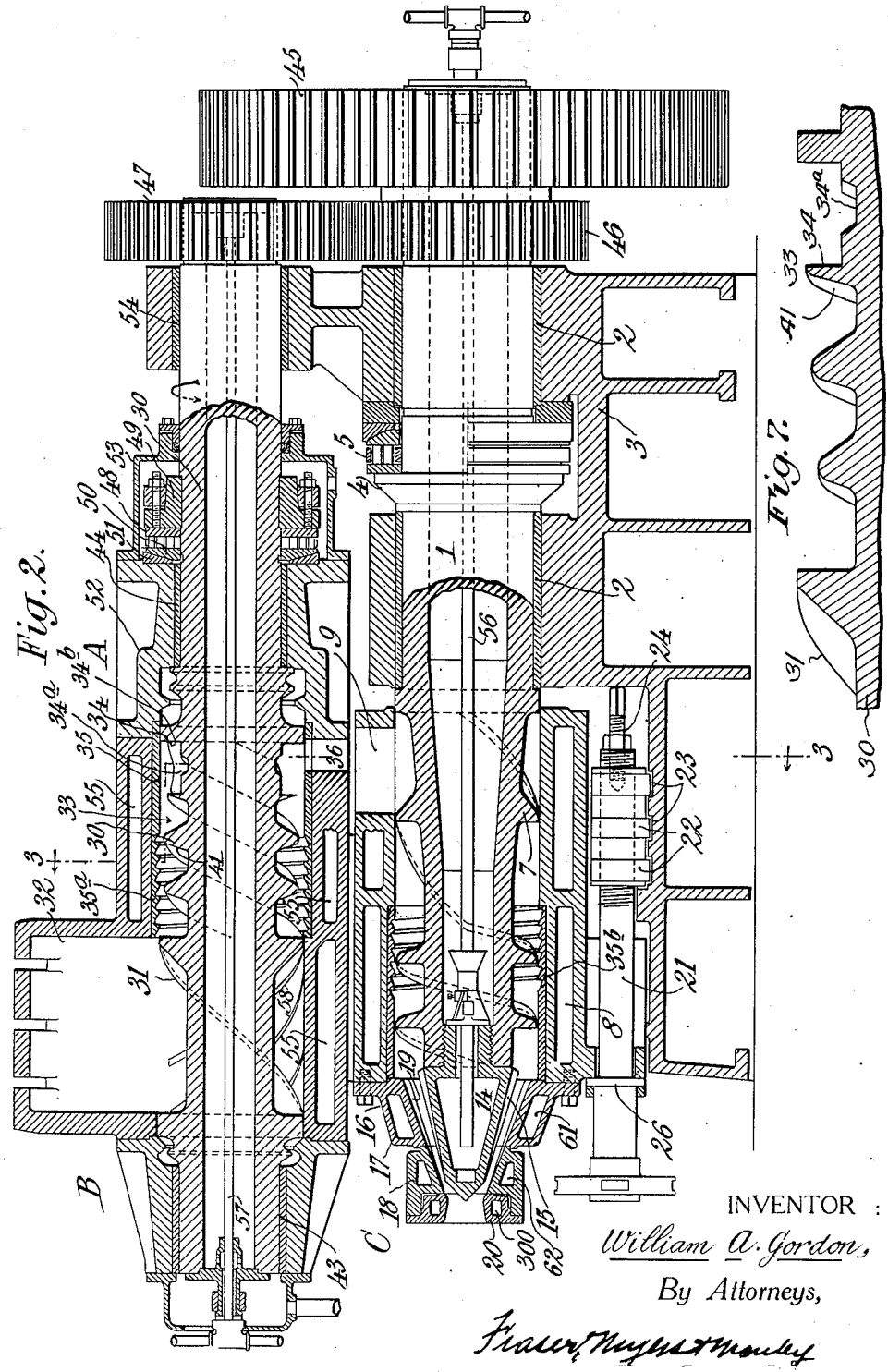
Fig. 2 is a central, vertical section of Fig. 1, showing the gears in elevation.

I prefer to form on the cylinder at the left-hand end of the screw, particularly, a series of ribs and grooves which are best illustrated in Fig. 2 at 35$^a$. These ribs and grooves preferably take the form of a thread or threads disposed in a direction to accelerate the flow of the material. If the threads of the worm 30 are so constructed as to urge the material toward the rear of the device when the shaft is rotated in the direction of the arrow, Fig. 2 (that is to say, having a right-hand inclination), the threads on the cylinder will be reversely pitched.

The use of the groove 34$^a$ and the threads 35$^a$ considerably increase the volumetric output of the first stage. This is very desirable since the second stage already described has a considerable capacity and must be served with considerable quantities of partially plasticated material in order to balance the two stages and provide for a maximum output.

Since it is not desired in the upper section to thoroughly knead the rubber, the conical tip of the lower section is preferably omitted, the kneading function being sufficiently taken care of for the preliminary steps by the work itself. This enables the worm to be supported in bearings 43, 44 arranged at its opposite ends, and also permits both worms to be driven from one end, as by a large gear 45 mounted upon the worm 1, the motion of this worm being transmitted to the upper worm by the gear set 46, 47.

Since the thrusts on the upper worm are in a direction reverse to that in the lower worm, the anti-friction bearing 48 is confined between a collar 49 mounted upon the worm 30, and suitable rings 50, 51 bearing against a section 52 of the housing which as shown in Fig. 1 is bolted to the main upper housing. Preferably a bearing casing 53 is provided which is connected to the section 52 of the housing. A third bearing 54 is best provided near the gear 47. The main housing is also preferably water-jacketed as shown at 55.

In order to facilitate the feed of the cold rubber into the hopper 32 I prefer to provide special feeding ribs 58 shown in dotted lines in Figure 1, and in full lines in Fig. 4. Any number of these may be utilized, and they may be variously inclined, the object being to assist in feeding the material in a rearward direction as the material is pushed rearwardly by the screw section 31. For the same purpose I preferably form a series of grooves 60 in that part of the upper casing which lies at the feed end, these grooves being traversed by the blades or threads 31. Fig. 6 illustrates one form of these grooves which are so designed as to accelerate the passage of the material to the right in Fig. 2. I have found in practice that if large pieces of rubber are fed into the hopper there is a tendency for the threads 31 to rotate them completely around. Such pieces are, however, in the present construction caught by the groove 60 and fed forwardly to the right.

I may utilize in the lower stage of the device a series of grooves 35$b$ which are similar to those shown at 35$a$ in the upper stage, or, as shown in my prior patent, the wall of the cylinder may be smooth.

The machine as thus described is very useful in initially plasticating crude rubber prior to its introduction into the mixing machines, and is also of great value in plasticating previously mixed compounds which have been stored when the latter are used for the purpose of manufacturing various rubber articles such as tires or the like. As compared with the machine of my prior patent I am enabled to produce a larger and better output, the homogeneity of the final product being considerably improved.

By the provision of the several water jackets I am enabled to control the heat of the rubber or rubber compound which is generated in the machine during the operation of plasticating. The result is that I not only obtain a larger yield but am enabled to prevent overheating, which is a great desideratum, and produce a product which if desired is at a considerably lower temperature.

To best control the temperature each of the worms is made hollow and the cooling or heating fluids are caused to circulate through pipes 56 and 57. I have found that the temperature of water introduced in the several water-cooling chambers of the housing is of some importance in determining the character of the yield. Thus in the first jacket of the upper device the water will be appropriately about 140°; and in the second jacket from 55° to 60°. In the first jacket of the lower device (in the line of travel of the material) a temperature of 140° approximately is used, while in the second jacket a temperature of 55° to 60° is availed of. In the jacket 61 which serves the housing I prefer to circulate water at approximately 220°, the same temperature being used in the jacket 62. In the final water jacket which surrounds the die 20 a temperature of 300° is best employed. All temperatures are Fahrenheit.

I have found the best results to be obtained in the use of my present invention by accurately proportioning the work of the two stages, since the most efficient action is obtained when the lower worm is neither overfed nor underfed; in the first case clogging would be apt to result, and in the second case the product is not as perfect. Some means of control such as the valve 37 is, hence, important, since this not only determines the rate of feed to the lower stage, and also controls the amount of work which is done in the upper stage.

While I have shown and described one form of the invention, it will be understood that I do not wish to be limited thereto, since various changes may be made therein without departing from the spirit of the invention.

For instance, while I have shown the device as comprising two stages mounted one upon the other, it will be understood that any other disposition of the two stages may be adopted.

What I claim is:

1. A machine for manipulating plastic materials, comprising means for initially handling the material, including a worm, and means for subsequently handling the material including a worm and a kneading means mounted at the end of the second worm.

2. A machine for manipulating plastic material comprising a two-stage apparatus, including a worm for handling the crude material and partially plasticating it, a second worm for receiving the partially plasticated material and putting the same under pressure, and a kneading means at the end of the second worm, the two worms being mounted one alongside the other and having suitable discharging and receiving passages whereby the output of the first is fed to the second.

3. A machine for manipulating plastic materials comprising a worm, a housing for said worm, a hopper or feed opening in said housing, said worm having graduated threads, a discharge opening at the opposite end to said hopper, a second worm mounted alongside the first and having a feed opening designed to receive the output of the first worm, a housing in which said feed opening is formed, and a kneading device mounted at the end of said second worm.

4. A machine for manipulating plastic materials comprising a bed, a housing slidable in said bed, a worm rotatable in said housing and having a kneading head, a second housing fixed to said bed and mounted above the first housing, a second worm rotatable in said second housing, said second worm adapted to receive the material to be plasticated, and means for rotating said worms to feed in opposite directions whereby the output from the second worm is fed to the first and therein subjected to a kneading operation.

5. In a machine for manipulating plastic materials a housing, a worm in said housing, said housing having a feed opening and said worm having a thread section of high pitch opposite said feed opening, and having beyond said section a second section of low pitch, the threads in a portion of said last-named section and the shape of the housing opposite the same being so constructed that there is a gradually decreasing distance between the tops of the threads and the interior wall of the housing.

6. A machine for manipulating plastic materials comprising a bed, an upper housing fixed to said bed, a lower housing slidable along said bed, means for adjusting the lower housing longitudinally on said bed, a worm mounted in the upper housing, a hopper in said upper housing, a cylindrical chamber in said upper housing, said worm having a thread a portion of which is of gradually increasing height whereby the distances between said thread and said cylindrical chamber is lessened toward the rear of the worm, a discharge orifice in said upper housing, a receiving orifice in the lower housing opposite said upper housing, and a worm in the lower housing having a threaded portion, and having a kneading tip at its end and a head surrounding said kneading tip.

7. A machine for manipulating plastic materials having two plasticating devices, one mounted above the other, and one feeding into the other one, and means for controlling the rate of said feed, said means comprising a part movable substantially in the line of flow of the material to vary the size of the feed passage.

8. A machine for manipulating plastic materials having two plasticating devices, one mounted above the other, and one feeding into the other one, and a valve for controlling the rate of said feed, said means comprising a part movable substantially.

9. A machine for manipulating plastic materials having two plasticating devices, one mounted above the other, and the upper one feeding into the lower one, and a valve for controlling the rate of said feed, said valve comprising a movable member for constricting the feed opening, and means for moving said member and holding it in its adjusted positions.

10. In a machine for manipulating plastic materials, a worm, a housing for said worm within which the threads of the worm rotate, and grooves or ribs on the inner face of said housing, said grooves or ribs being arranged spirally to feed the material forwardly and the faces of the ribs being abrupt on the sides remote from the feed point and sloped on the opposite side.

11. A machine for manipulating plastic materials having a worm, and a housing for said worm, said worm having a portion of its threads removed to form a groove at the delivery end of the worm, and a scraper or plow for the material extending into said groove.

12. A machine for manipulating plastic materials having a worm, and a housing for said worm, said worm having an annular space near its delivery end and a scraper or plow for the material extending into said space.

In witness whereof, I have hereunto signed my name.

WILLIAM A. GORDON.

CERTIFICATE OF CORRECTION.

Patent No. 1,849,291.  Granted March 15, 1932, to

WILLIAM A. GORDON.

It is hereby certified that error appears in the printed specification of the above numbered patent requiring correction as follows: Page 2, line 25, for the word "work" read worm; page 4, line 112, claim 8, after the word "substantially" insert the words in the line of follow of the material to vary the size of the feed passage; and that the said Letters Patent should be read with these corrections therein that the same may conform to the record of the case in the Patent Office.

Signed and sealed this 17th day of May, A. D. 1932.

(Seal)

M. J. Moore,
Acting Commissioner of Patents.

CERTIFICATE OF CORRECTION.

Patent No. 1,849,291.                                      March 15, 1932.

WILLIAM A. GORDON.

It is hereby certified that in Certificate of Correction issued May 17, 1932, in the above numbered patent the word "follow" in line 4, should read flow; and that the said Certificate may conform to the records of this office.

Signed and sealed this 12th day of July, A. D. 1932.

(Seal)                                                 M. J. Moore,
                                                               Acting Commissioner of Patents.